US011990077B1

(12) United States Patent
Tai

(10) Patent No.: US 11,990,077 B1
(45) Date of Patent: May 21, 2024

(54) DISPLAY DEVICE AND LUMINANCE AND COLOR COMPENSATION METHOD THEREOF

(71) Applicant: AUO Corporation, Hsinchu (TW)

(72) Inventor: Chun-Han Tai, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/085,544

(22) Filed: Dec. 20, 2022

(30) Foreign Application Priority Data

Nov. 29, 2022 (CN) ......................... 202211511857.0

(51) Int. Cl.
*G09G 3/20* (2006.01)
*G09G 3/32* (2016.01)

(52) U.S. Cl.
CPC ............. *G09G 3/2007* (2013.01); *G09G 3/32* (2013.01); *G09G 2320/0233* (2013.01); *G09G 2320/0242* (2013.01); *G09G 2360/16* (2013.01)

(58) Field of Classification Search
CPC ................... G09G 3/2007; G09G 3/32; G09G 2320/0233; G09G 2320/0242; G09G 2360/16
See application file for complete search history.

(56) References Cited

U.S. PATENT DOCUMENTS

| | | | | |
|---|---|---|---|---|
| 10,347,164 | B2 * | 7/2019 | Roh | G09G 3/2003 |
| 2014/0340431 | A1 * | 11/2014 | Yamakawa | G09G 3/2003 345/690 |
| 2022/0172664 | A1 * | 6/2022 | Park | G09G 5/10 |

FOREIGN PATENT DOCUMENTS

| | | |
|---|---|---|
| CN | 1326088 | 7/2007 |
| CN | 113674663 | 11/2021 |

* cited by examiner

*Primary Examiner* — Gene W Lee
(74) *Attorney, Agent, or Firm* — JCIPRNET

(57) ABSTRACT

A display device and a luminance and color compensation method thereof are provided. The luminance and color compensation method includes: calculating a plurality of compensation values of a plurality of display pixels of a plurality of setting grayscale values based on at least one selected color; recording the compensation values to obtain look-up information; receiving a plurality of image gray-scale values of a display image, and obtaining a plurality of selected compensation values respectively corresponding to the display pixels according to the look-up information based on the image grayscale values; and respectively compensating display luminance of the display pixels according to the selected compensation values.

17 Claims, 6 Drawing Sheets

DISPLAY DEVICE AND LUMINANCE AND COLOR COMPENSATION METHOD THEREOF

CROSS-REFERENCE TO RELATED APPLICATION

This application claims the priority benefit of China application serial no. 202211511857.0, filed on Nov. 29, 2022. The entirety of the above-mentioned patent application is hereby incorporated by reference herein and made a part of this specification.

BACKGROUND

Technical Field

The invention relates to a display device and a luminance and color compensation method thereof, and particularly relates to a display device capable of improving display luminance and color uniformity and a luminance and color compensation method thereof.

DESCRIPTION OF RELATED ART

In a self-luminous panel, each light-emitting element (taking a light-emitting diode as an example) may have a different light-emitting wavelength due to process differences, such as differences in epitaxial temperature, pollution and other factors, which results in poor uniformity of a display image. Even if all of display pixels on the entire panel display a same grayscale, point-to-point luminance and color differences may occur, resulting in mottled display images.

SUMMARY

The invention is directed to a display device and a luminance and color compensation method thereof, which are adapted to improve display luminance and color uniformity.

The invention provides a luminance and color compensation method adapted to a self-luminous display panel. The luminance and color compensation method includes following steps. A plurality of compensation values of a plurality of display pixels of a plurality of setting grayscale values are calculated based on at least one selected color. The compensation values are recorded to obtain look-up information. A plurality of image grayscale values of a display image are received, and based on the image grayscale values, a plurality of selected compensation values respectively corresponding to the display pixels are obtained according to the look-up information. Display luminance of the display pixels is respectively compensated according to the selected compensation values.

The invention provides a display device including a display panel and a controller. The controller is coupled to the display panel, and is configured to execute the above luminance and color compensation method.

Based on the above description, the invention calculates a plurality of compensation values of a plurality of display pixels of the setting grayscale values for one or more selected colors. When performing an image display operation, corresponding to each display pixel, the corresponding compensation value may be found according to an image grayscale value to be displayed to perform the luminance and color compensation operation of the display pixel. In this way, the display device of the invention may compensate the luminance and color of each display pixel point by point, thereby effectively improving the display quality of the display image.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
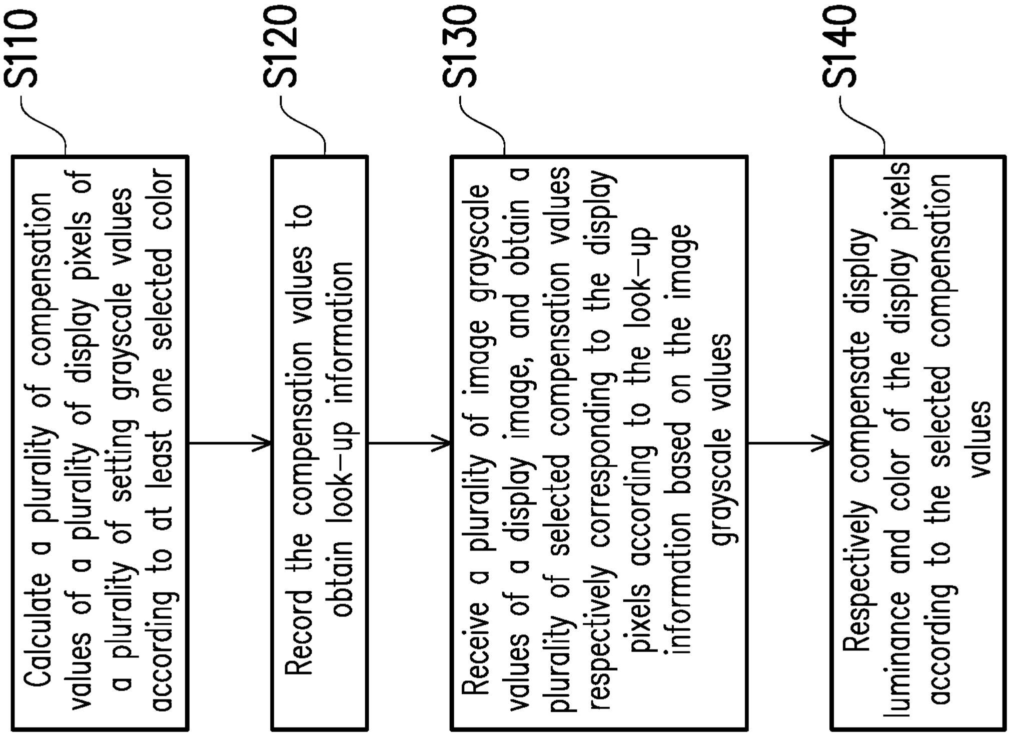
FIG. 1 is a flowchart of a luminance and color compensation method of a self-luminous display panel according to an embodiment of the invention.

Referring to FIG. 1, FIG. 1 is a flowchart of a luminance and color compensation method of a self-luminous display panel according to an embodiment of the invention. In step S110, a controller of the self-luminous display panel may calculate a plurality of compensation values of a plurality of display pixels of a plurality of setting grayscale values based on one or more selected colors. Where, the selected color may be a single white color, or multiple basic colors, such as red, green, and blue. The controller may also select a plurality of setting grayscale values within a display grayscale range of the self-luminous display panel. Taking an 8-bit display grayscale range as an example, the controller may select, for example, 6 setting grayscale values, such as grayscale values 10, 18, 25, 76, 178, and 255 from a display grayscale range of 0-255. Certainly, the above-mentioned number and values of the setting grayscale values are just an example for illustration, and are not intended to limit the scope of the invention. In an actual operation, a designer may set the number and values of the grayscale values according to actual needs without any specific limitation.

In addition, in step S110, the controller calculates a plurality of compensation values respectively corresponding to a plurality of display pixels in the self-luminous display panel under the above-mentioned plurality of setting grayscale values. It should be noted that in the self-luminous panel, each of the light-emitting elements (for example, light-emitting diode) may have a different light-emitting wavelength due to process differences, which results in poor uniformity of a display image. Therefore, in the luminance and color compensation method of the embodiment of the invention, the controller may record the compensation values under different setting grayscale values corresponding to the selected color for each pixel in the self-luminous display panel.

Figure 2:
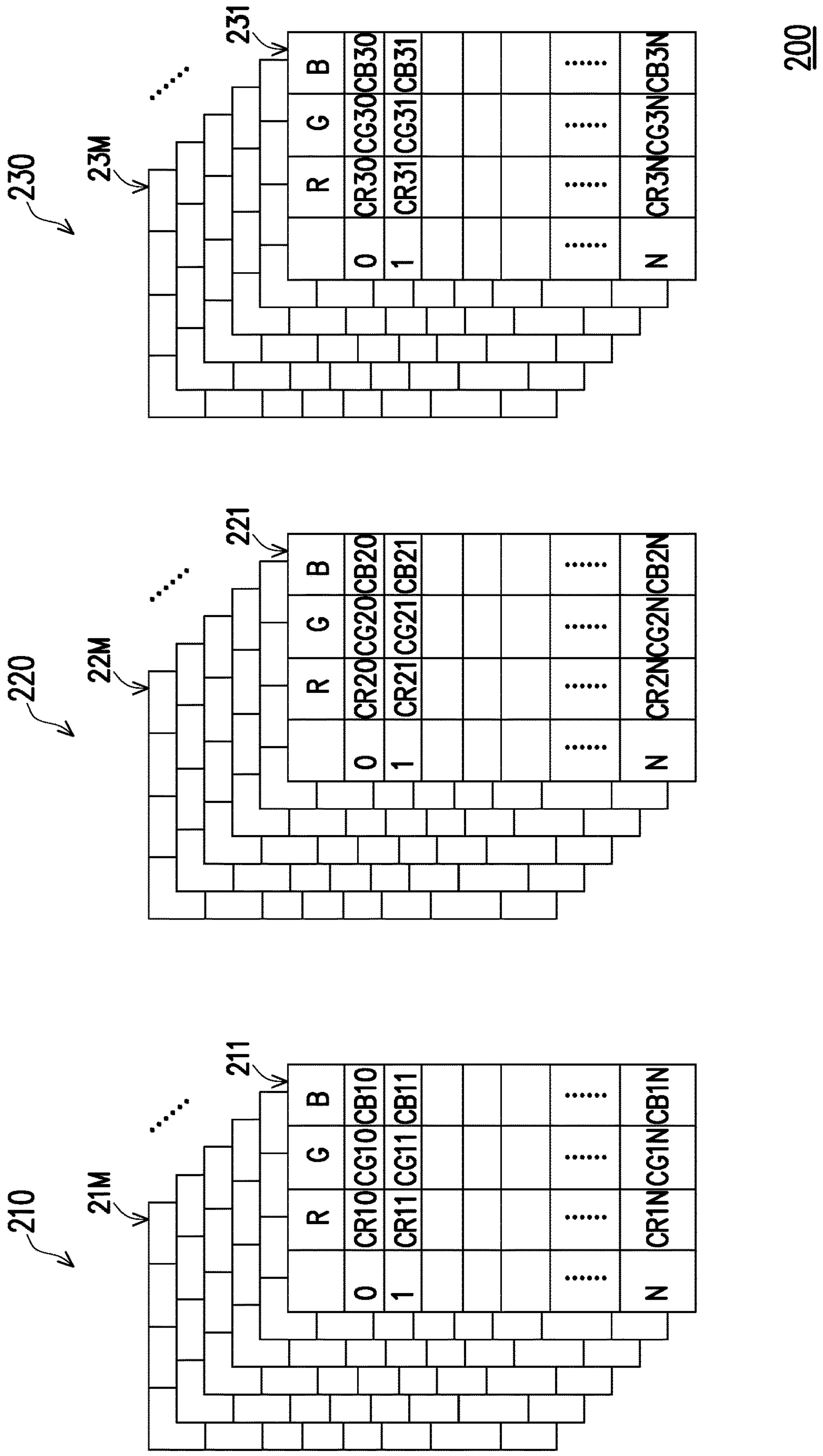
FIG. 2 is a schematic diagram of look-up information of a luminance and color compensation method according to an embodiment of the invention.

Then, in step S120, the controller may record the above-mentioned multiple compensation values and obtain look-up information. Referring to FIG. 1 and FIG. 2 at the same time, and FIG. 2 is a schematic diagram of look-up information of a luminance and color compensation method according to an embodiment of the invention. In FIG. 2, the controller may set three sets of data 210-230 for three different selected colors to generate look-up information 200. The data 210, for example, corresponds to the selected color of red; the data 220, for example, corresponds to the selected color of green; and the data 230, for example, corresponds to the selected color of blue. The data 210 is divided into a plurality of sets of sub-data respectively corresponding to a plurality of setting grayscale values 211-21M; the data 220 is divided into a plurality of sets of sub-data respectively corresponding to a plurality of setting grayscale values 221-22M; and the data 230 is divided into a plurality of sets of sub-data respectively corresponding to a plurality of setting grayscale values 231-23M. The self-luminous display panel, for example, has N+1 display pixels, each set of sub-data includes multiple colors (such as red R, green G, blue B) corresponding to each display pixel (a $0^{th}$ pixel to a $N^{th}$ pixel), where M and N are both arbitrary positive integers.

For example, in the data 210 corresponding to the selected color of red, the sub-data corresponding to the setting grayscale value 211 includes: components CR10, CG10 and CB10 of a plurality of compensation values of the $0^{th}$ display pixel respectively corresponding to red R, green G and blue B; components CR11, CG11 and CB11 of a plurality of compensation values of the $1^{st}$ display pixel respectively corresponding to red R, green G and blue B; . . . ; components CR1N, CG1N and CB1N of a plurality of compensation values of the $N^{th}$ display pixel respectively corresponding to red R, green G and blue B. In the data 220 corresponding to the selected color of green, the sub-data corresponding to the setting grayscale value 221 includes: components CR20, CG20 and CB20 of a plurality of compensation values of the $0^{th}$ display pixel respectively corresponding to red R, green G and blue B; components CR21, CG21 and CB21 of a plurality of compensation values of the $1^{st}$ display pixel respectively corresponding to red R, green G and blue B; . . . ; components CR2N, CG2N and CB2N of a plurality of compensation values of the $N^{th}$ display pixel respectively corresponding to red R, green G and blue B. In the data 230 corresponding to the selected color of blue, the sub-data corresponding to the setting grayscale value 231 includes: components CR30, CG30 and CB30 of a plurality of compensation values of the $0^{th}$ display pixel respectively corresponding to red R, green G and blue B; components CR31, CG31 and CB31 of a plurality of compensation values of the $1^{st}$ display pixel respectively corresponding to red R, green G and blue B; . . . ; components CR3N, CG3N and CB3N of a plurality of compensation values of the $N^{th}$ display pixel respectively corresponding to red R, green G and blue B.

Referring to FIG. 1 again, in step S130, the controller may receive a plurality of image grayscale values of a display image to be displayed, and obtain a plurality of selected compensation values respectively corresponding to a plurality of display pixels according to look-up information based on the above image grayscale values. Moreover, in step S140, display luminance of the display pixels is respectively compensated according to the obtained selected compensation values.

For example, when the controller is to calculate the compensation values of the $0^{th}$ display pixel, the controller may first find out first image grayscale values corresponding to the $0^{th}$ display pixel in the image grayscale values, where the first image grayscale values may include a red image grayscale value, a green image grayscale value, and a blue image grayscale value. Then, the controller may determine which one of the setting grayscale values 211-21M (for example, the setting grayscale value 211) is equal to the red image grayscale value; which one of the setting grayscale values 221-22M (for example, the setting grayscale value 221) is equal to the green image grayscale value; and which one of the setting grayscale values 231-23M (for example, the setting grayscale value 231) is equal to the blue image grayscale value.

Then, continuing the above-mentioned implementation example, the controller may find out a plurality of compensation values corresponding to the $0^{th}$ display pixel (including the components CR10, CG10, CB10, CR20, CG20, CB20, CR30, CG30, CB30 of the compensation values), and add the components CR10, CR20, CR30 of the compensation values, add the components CG10, CG20, CG30 of the compensation values, and add the components CB10, CB20, CB30 of the compensation values to produce three components of the selected compensation value.

In this way, the controller may perform a luminance compensation operation on the $0^{th}$ display pixel according to the three components of the selected compensation value.

According to the above description, the controller may perform luminance compensation for the $1^{st}$ display pixel to the $N^{th}$ display pixel one by one, and improve uniformity of the display image of the self-luminous display panel.

It should be noted that in the embodiment of the invention, when the red color of a single display pixel is compensated, in addition to adjusting display luminance of a red sub-pixel of this display pixel, display luminance of a blue sub-pixel and a green-sub pixel of the display pixel may also be adjusted to complete the compensation operation of the display pixel through a color mixing.

Figure 3:
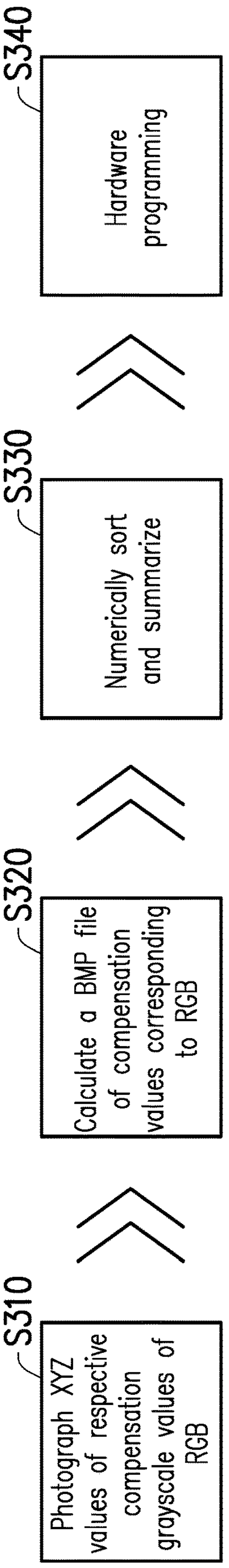
FIG. 3 is a flowchart of a method for generating look-up information of the luminance and color compensation method according to an embodiment of the invention.

Referring to FIG. 3, FIG. 3 is a flowchart of a method for generating look-up information of the luminance and color compensation method according to an embodiment of the invention. In the embodiment, when the look-up information is generated, the display device of the self-luminous display panel may display a test image according to the selected color and each setting grayscale value. In step S310, the test image may be photographed to complete an image capturing operation, and the controller in the display device may perform image analysis to calculate a plurality of stimulus values X, Y, Z respectively corresponding to a plurality of compensation colors (red R, green G, blue B) according to the test image. Then, a transformation matrix may be obtained according to the obtained stimulus values based on a color complementary principle, where the transformation matrix is equal to a matrix formed by multiplying a color space transformation matrix by a plurality of compensation values to be calculated. The color space transformation matrix may be generated according to the stimulus values X, Y, Z. The transformation matrix multiplied by a compensation color vector may be equal to a target color vector. As the compensation color vector, the target color vector and the color space transformation matrix are known, the controller may calculate a matrix formed by the compensation values through matrix operation, and obtain a plurality of components of the compensation values.

Then, in step S320, the controller may calculate image files (such as bit map (BMP) files) of compensation values corresponding to multiple compensation colors (red R, green G, blue B). Namely, the controller may generate image files according to a plurality of compensation values corresponding to each setting grayscale value in each selected color. The aforementioned multiple compensation values may be as shown in FIG. 2. In order to reduce a size of the image file, in step S330, the controller may numerically sort and summarize the compensation values of the image file based on a same gamma value to perform data compression. Then, in step S340, the controller may write the compressed image file into a memory device by means of hardware programming.

Furthermore, in order to further reduce a data amount of the compensation values, the controller may preset a grayscale threshold, and when the setting grayscale value is less than the grayscale threshold, the controller downgrades a plurality of components respectively corresponding to a first color and a second color in each compensation value to a first component where the first color and the second color are different from the selected color. Namely, under a low grayscale display condition, in the selected color corresponding to red, the components of the compensation values of blue and green may be downgraded to the first component, where the first component may be, for example, equal to 0.

Namely, when each setting grayscale value is not less than the grayscale threshold (under high grayscale display conditions), the multiple components (equal to a second component) of the first color and the second color (where the first color and the second color are different from the selected color) corresponding to each compensation value are greater than the above-mentioned first component. Namely, under a high grayscale display condition, in the selected color corresponding to red, the components of the compensation values of blue and green may be regarded as the second component, where the second component is greater than the first component under the above-mentioned low grayscale display condition.

In the embodiment of the invention, the grayscale threshold may be equal to 32. Certainly, the designer may adjust the above-mentioned grayscale threshold according to the characteristics of the self-luminous display panel, which is not specifically limited.

Figure 4:
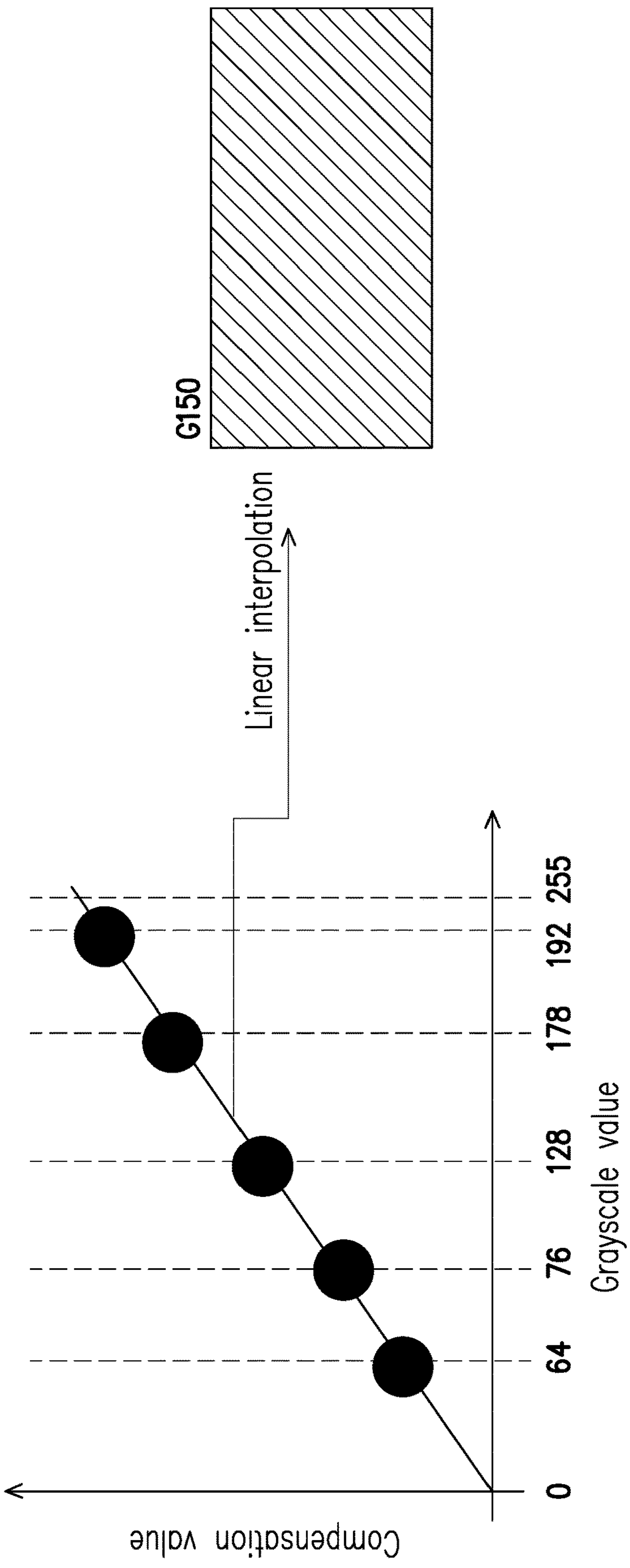
FIG. 4 is a schematic diagram of an implementation of a linear interpolation operation in the luminance and color compensation method according to an embodiment of the invention.

Referring to FIG. 4, FIG. 4 is a schematic diagram of an implementation of a linear interpolation operation in the luminance and color compensation method according to an embodiment of the invention. When performing the step of obtaining multiple selected compensation values as in step S130, when the image grayscale value is not equal to any of the setting grayscale values, the selected compensation value may be calculated by linear interpolation. In FIG. 4, when the setting grayscale values are, for example, 64, 76, 128, 178, 192, 255, and a green grayscale value G150 of the image grayscale value is not equal to any of the above setting grayscale values, the controller may first find out the compensation values of two setting grayscale values (128 and 178) that are close to the green grayscale value G150, and perform interpolation operation according to the compensation values corresponding to the setting grayscale values 128 and 178, so as to generate the selected compensation value.

The above-mentioned interpolation operation is an operation means known to those skilled in the art, and details thereof are not repeated.

Figure 5:
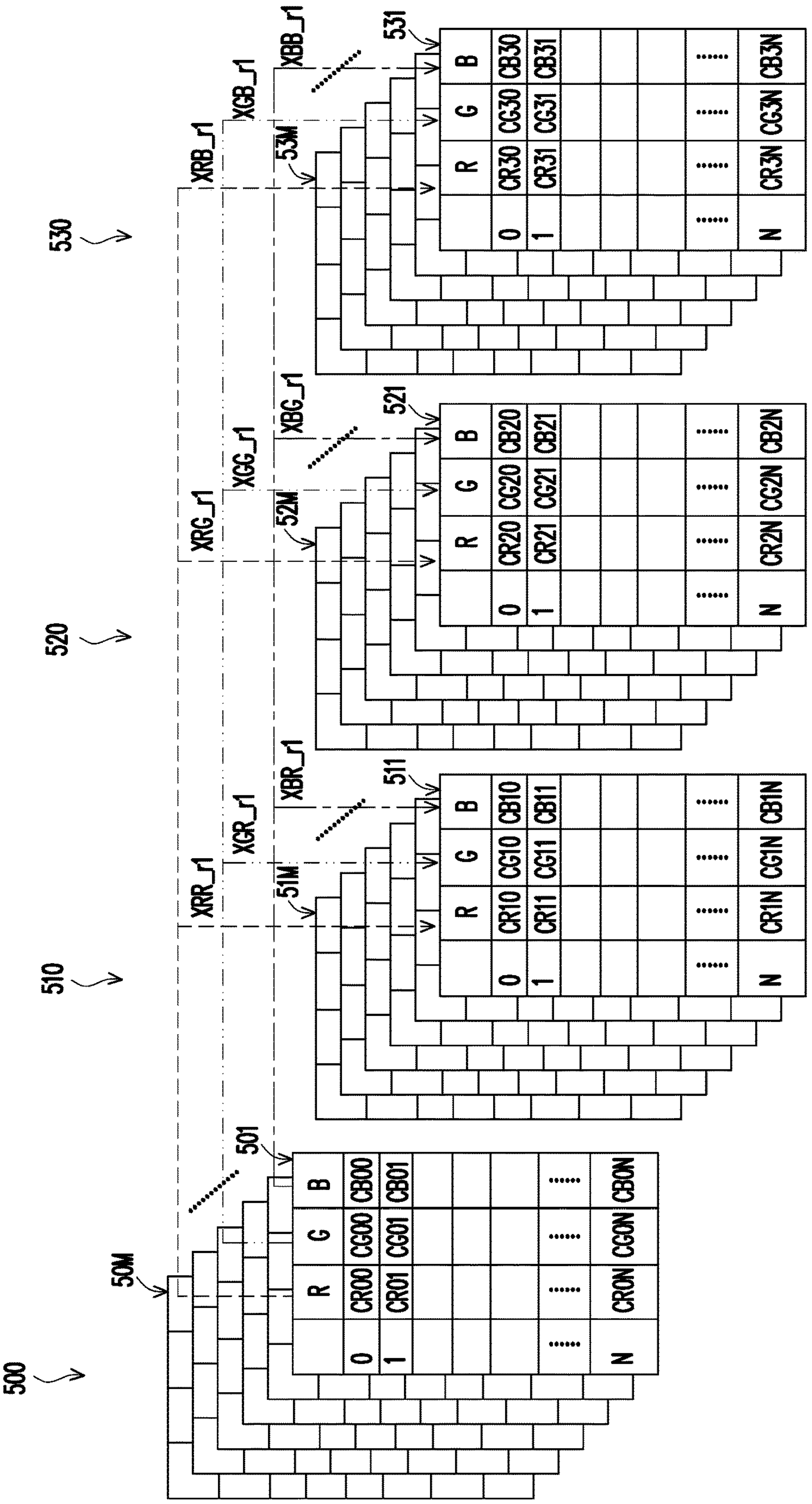
FIG. 5 is a schematic diagram of look-up information of a luminance and color compensation method according to another embodiment of the invention.

Referring to FIG. 5 below, FIG. 5 is a schematic diagram of look-up information of a luminance and color compensation method according to another embodiment of the invention. In order to reduce a data size of look-up information 500, the controller may set white as a single selected color, and generate a plurality of red (R) components CR00-CR0N, a plurality of green (G) components CG00-CG0N, and a plurality of blue (B) components CB00-CB0N of a plurality of compensation values corresponding to a plurality of display pixels 0-N of the self-luminous display panel according to setting grayscale value 501-50M. By only storing the compensation values of a plurality of setting grayscale values of the single selected color, the data amount of the look-up information 500 may be effectively reduced (⅓ of the embodiment in FIG. 2).

When performing an actual compensation operation of a display image, the controller may perform calculations on the look-up information 500, so that the components CR00-CR0N, CG00-CG0N, and CB00-CB0N of a plurality of compensation values in the look-up information 500 are respectively multiplied by a plurality of ratio values RR_r1, GR_r1 and BR_r1 to obtain look-up information 510 corresponding to the selected color of red; the components CR00-CR0N, CG00-CG0N, and CB00-CB0N of a plurality of compensation values in the look-up information 500 are respectively multiplied by a plurality of ratio values RG_r1, GG_r1 and BG_r1 to obtain look-up information 520 corresponding to the selected color of green; and the components CR00-CR0N, CG00-CG0N, and CB00-CB0N of a plurality of compensation values in the look-up information 500 are respectively multiplied by a plurality of ratio values RB_r1, GB_r1 and BB_r1 to obtain look-up information 530 corresponding to the selected color of blue.

Where, the ratio value RR_r1 represents a proportion of the red sub-pixel actually contributing to a red display effect in white light when performing luminance compensation of the red sub-pixel; the ratio value GR_r1 represents a proportion of the green sub-pixel actually contributing to the red display effect in white light when performing luminance compensation of the red sub-pixel; and the ratio value BR_r1 represents a proportion of the blue sub-pixel actually contributing to the red display effect in white light when performing luminance compensation of the red sub-pixel. The ratio value RG_r1 represents a proportion of the red sub-pixel actually contributing to the red display effect in white light when performing luminance compensation of the green sub-pixel; the ratio value GG_r1 represents a proportion of the green sub-pixel actually contributing to the red display effect in white light when performing luminance compensation of the green sub-pixel; and the ratio value BG_r1 represents a proportion of the blue sub-pixel actually contributing to the red display effect in white light when performing luminance compensation of the green sub-pixel. The ratio value RB_r1 represents a proportion of the red sub-pixel actually contributing to the red display effect in white light when performing luminance compensation of the blue sub-pixel; the ratio value GB_r1 represents a proportion of the green sub-pixel actually contributing to the red display effect in white light when performing luminance compensation of the blue sub-pixel; and the ratio value BB_r1 represents a proportion of the blue sub-pixel actually contributing to the red display effect in white light when performing luminance compensation of the blue sub-pixel.

The above ratio values RR_r1, GR_r1, BR_r1, RG_r1, GG_r1, BG_r1, RB_r1, GB_r1, and BB_r1 may all be obtained through experimental measurement in advance. And the ratio values RR_r1, GR_r1, BR_r1, RG_r1, GG_r1, BG_r1, RB_r1, GB_r1, BB_r1 may be pre-stored in any storage element in the display device for accessing by the controller.

Through the above calculation operations, the controller may perform look-up operations on a plurality of selected compensation values of the display pixels according to the components CR10-CR3N, CG10-CG3N and CB10-CB3N of the multiple compensation values in the look-up tables 510, 520, and 530, and compensate the display luminance of the display pixels according to the selected compensation values.

The look-up operations for the selected compensation values have been described in detail in the above-mentioned embodiments, and details thereof are not repeated here.

Figure 6:
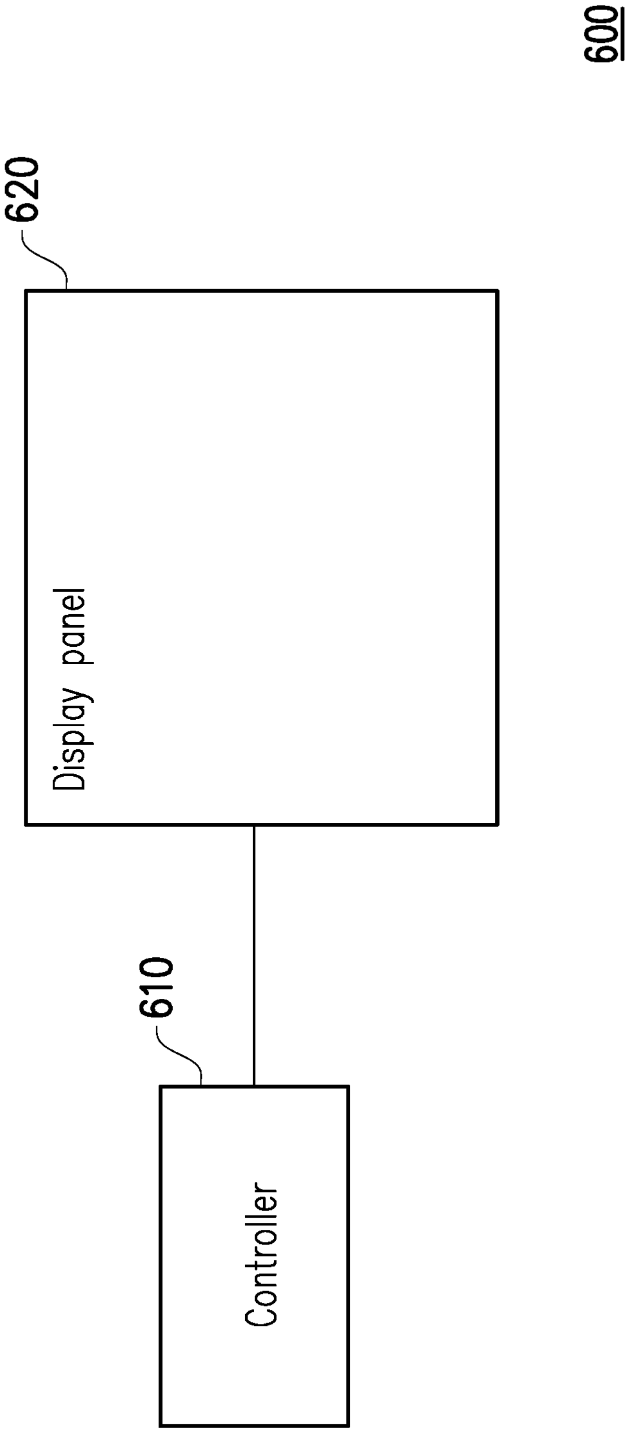
FIG. 6 is a schematic diagram of a display device according to an embodiment of the invention.

Referring to FIG. 6, FIG. 6 is a schematic diagram of a display device according to an embodiment of the invention. The display device 600 includes a controller 610 and a display panel 620. The display panel 620 is a self-luminous display panel, for example, any form of a light-emitting diode display panel. The controller 610 is coupled to the display panel 620, and is configured to execute steps S110 to S140 as shown in FIG. 1 to perform luminance and color compensation for each display pixel of the display panel 620, so as to improve the luminance and color uniformity of the display image generated by the display panel 620.

The operation details of the controller 610 have been described in detail in the aforementioned embodiments, which will not be repeated here.

In the embodiment, the controller 610 may be a processor with computing capability. Alternatively, the controller 610 may be designed through a hardware description language (Hardware Description Language, HDL) or any other digital circuit design method known to those skilled in the art, and may be a hardware circuit implemented through a field programmable logic gate array (FPGA), a complex programmable logic device (CPLD), or an application-specific integrated circuit (ASIC).

In summary, the display device of the invention calculates compensation values corresponding to multiple setting grayscale values based on at least one selected color for each display pixel in the display panel. By looking up the look-up information established according to the compensation values, the luminance compensation operation of each display pixel may be performed according to the multiple image grayscale values of the display image. In this way, the display luminance and color of each display pixel of the self-luminous display panel may be effectively compensated, which may improve the overall luminance and color uniformity of the display image.

What is claimed is:

1. A luminance and color compensation method, adapted to a self-luminous display panel, comprising:

calculating a plurality of compensation values of a plurality of display pixels of a plurality of setting grayscale values based on at least one selected color;

recording the compensation values to obtain look-up information;

receiving a plurality of image grayscale values of a display image, and obtaining a plurality of selected compensation values respectively corresponding to the display pixels according to the look-up information based on the image grayscale values; and respectively compensating display luminance of the display pixels according to the selected compensation values, wherein the compensation values are calculated according to a color complementary principle.

2. The luminance and color compensation method according to claim 1, wherein the step of calculating the compensation values of the display pixels of the setting grayscale values based on the at least one selected color comprises:

displaying, by the display device, a test image according to the at least one selected color and each of the setting grayscale values;

capturing the test image, and calculating a plurality of stimulus values respectively corresponding to a plurality of compensation colors according to the test image;

obtaining a transformation matrix according to the stimulus values; and generating the compensation values according to the transformation matrix.

3. The luminance and color compensation method according to claim 2, wherein the transformation matrix is equal to a matrix formed by multiplying a color space transformation matrix by the compensation values.

4. The luminance and color compensation method according to claim 2, wherein the step of recording the compensation values to obtain the look-up information comprises:

generating an image file according to the compensation values corresponding to each of the at least one selected color and each of the setting grayscale values;

numerically sorting the compensation values of the image file based on a same gamma value to perform data compression; and writing the compressed image file into a memory device.

5. The luminance and color compensation method according to claim 1, wherein each of the compensation values has a plurality of components, and the components respectively correspond to a first color, a second color, and each of the at least one selected color, wherein the first color, the second color and each of the at least one selected color are different from each other.

6. The luminance and color compensation method according to claim 5, wherein the step of calculating the compensation values of the display pixels of the setting grayscale values based on the at least one selected color further comprises:

setting a grayscale threshold, and downgrading a plurality of first components in each of the compensation values respectively corresponding to the first color and the second color when each of the setting grayscale values is less than the grayscale threshold, wherein the first color and the second color are different from the at least one selected color.

7. The luminance and color compensation method according to claim 6, wherein when each of the setting grayscale values is not less than the grayscale threshold, a plurality of second components corresponding to the first color and the second color of each of the compensation values are greater than the respective corresponding first components.

8. The luminance and color compensation method according to claim 6, wherein the first components are all equal to 0.

9. The luminance and color compensation method according to claim 1, wherein the at least one selected color includes selected colors red, green, and blue, or the at least one selected color is white.

10. The luminance and color compensation method according to claim 9, wherein when the at least one selected color is white, the luminance and color compensation method further comprises:

respectively multiplying the compensation values corresponding to the at least one selected color by a plurality of ratio values to generate a plurality of first compensation values corresponding to red, a plurality of second compensation values corresponding to green, and a plurality of third compensation values corresponding to blue.

11. A display device, comprising:

a display panel; and a controller, coupled to the display panel and configured to:

calculate a plurality of compensation values of a plurality of display pixels of a plurality of setting grayscale values based on at least one selected color;

record the compensation values to obtain look-up information;

receive a plurality of image grayscale values of a display image, and obtain a plurality of selected compensation values respectively corresponding to the display pixels according to the look-up information based on the image grayscale values; and respectively compensate display luminance of the display pixels according to the selected compensation values, wherein the compensation values are calculated according to a color complementary principle.

12. The display device according to claim 11, further comprising an image capturing device, wherein the display device displays a test image according to the at least one selected color and each of the setting grayscale values, the image capturing device captures the test image, and the controller is further configured to:

calculate a plurality of stimulus values respectively corresponding to a plurality of compensation colors according to the test image;

obtain a transformation matrix according to the stimulus values; and generate the compensation values according to the transformation matrix.

13. The display device according to claim 12, wherein the transformation matrix is equal to a matrix formed by multiplying a color space transformation matrix by the compensation values.

14. The display device according to claim 12, wherein the controller is further configured to:

generate an image file according to the compensation values corresponding to each of the at least one selected color and each of the setting grayscale values;

numerically sort the compensation values of the image file based on a same gamma value to perform data compression; and write the compressed image file into a memory device.

15. The display device according to claim 14, wherein the controller is further configured to:

set a grayscale threshold, and downgrade a plurality of first components in each of the compensation values respectively corresponding to the first color and the second color when each of the setting grayscale values is less than the grayscale threshold, wherein when each of the setting grayscale values is not less than the grayscale threshold, a plurality of second components corresponding to the first color and the second color of each of the compensation values are greater than the respective corresponding first components.

16. The display device according to claim 11, wherein each of the compensation values has a plurality of components, and the components respectively correspond to a first color, a second color, and each of the at least one selected color, wherein the first color, the second color, and each of the at least one selected color are different from each other.

17. The display device according to claim 11, wherein the at least one selected color includes selected colors red, green, and blue, or the at least one selected color is white, and when the at least one selected color is white, the controller is further configured to:

respectively multiply the compensation values corresponding to the at least one selected color by a plurality of ratio values to generate a plurality of first compensation values corresponding to red, a plurality of second compensation values corresponding to green, and a plurality of third compensation values corresponding to blue.

* * * * *